April 11, 1939.  C. P. GOERL  2,154,305
COOKING KIT
Filed March 9, 1936  3 Sheets-Sheet 1
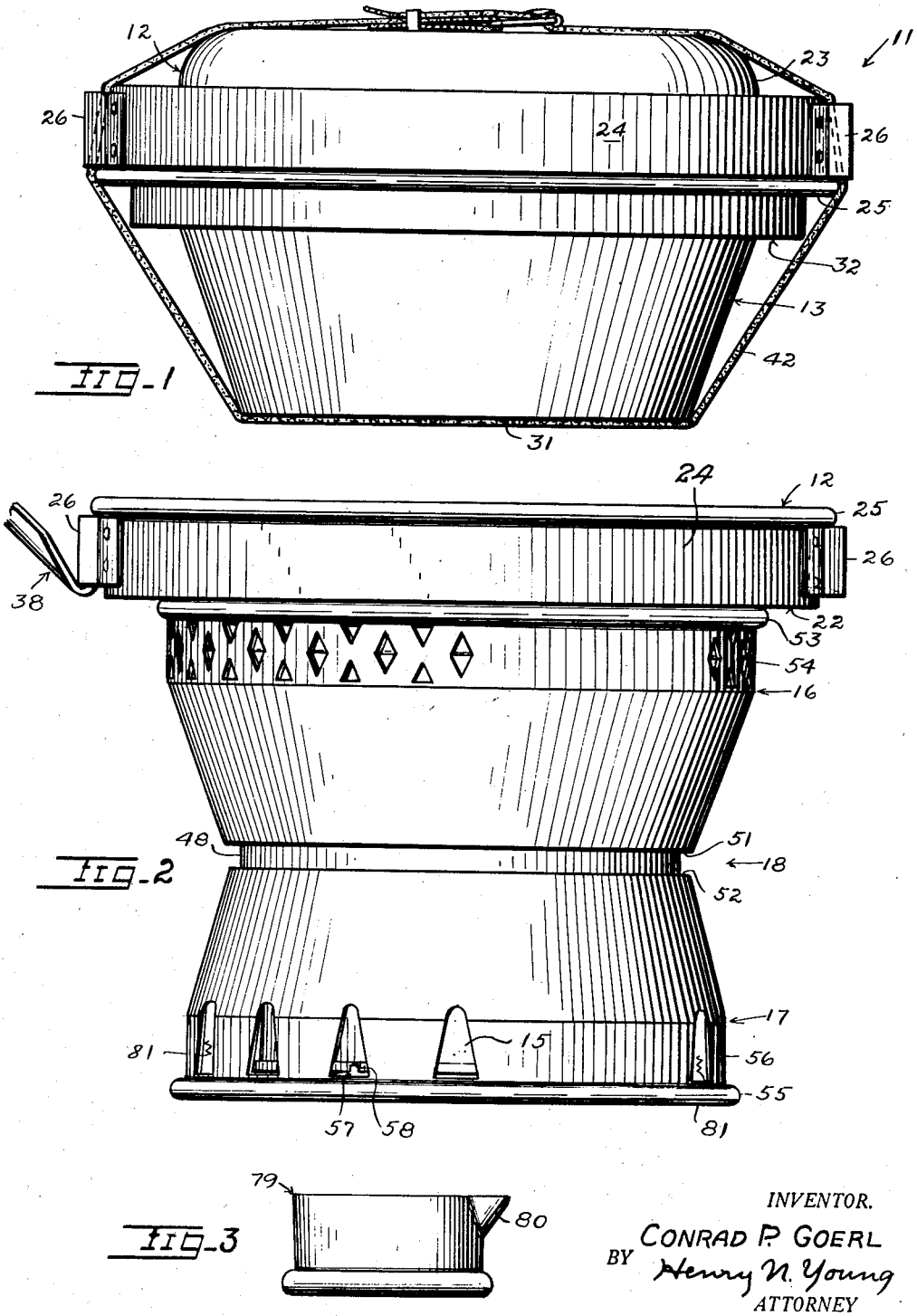
INVENTOR.
CONRAD P. GOERL
BY Henry N. Young
ATTORNEY April 11, 1939.  C. P. GOERL  2,154,305
COOKING KIT
Filed March 9, 1936   3 Sheets-Sheet 2
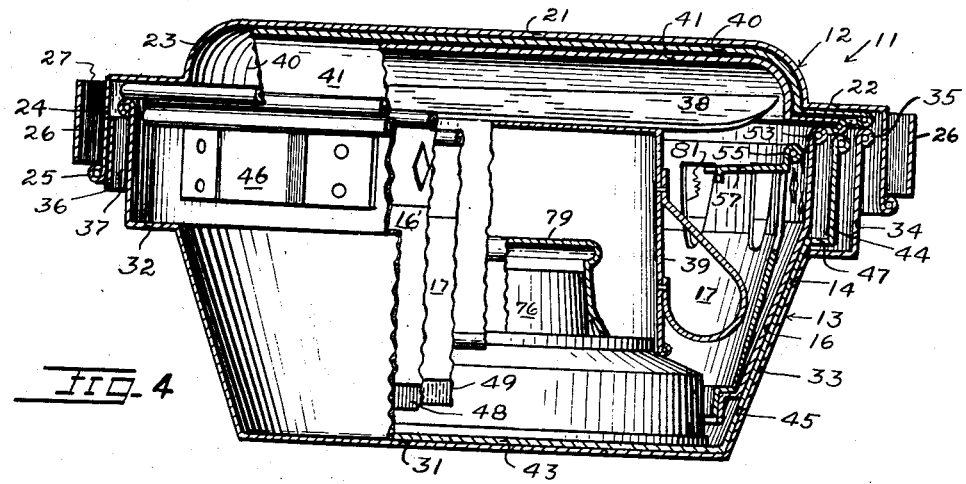
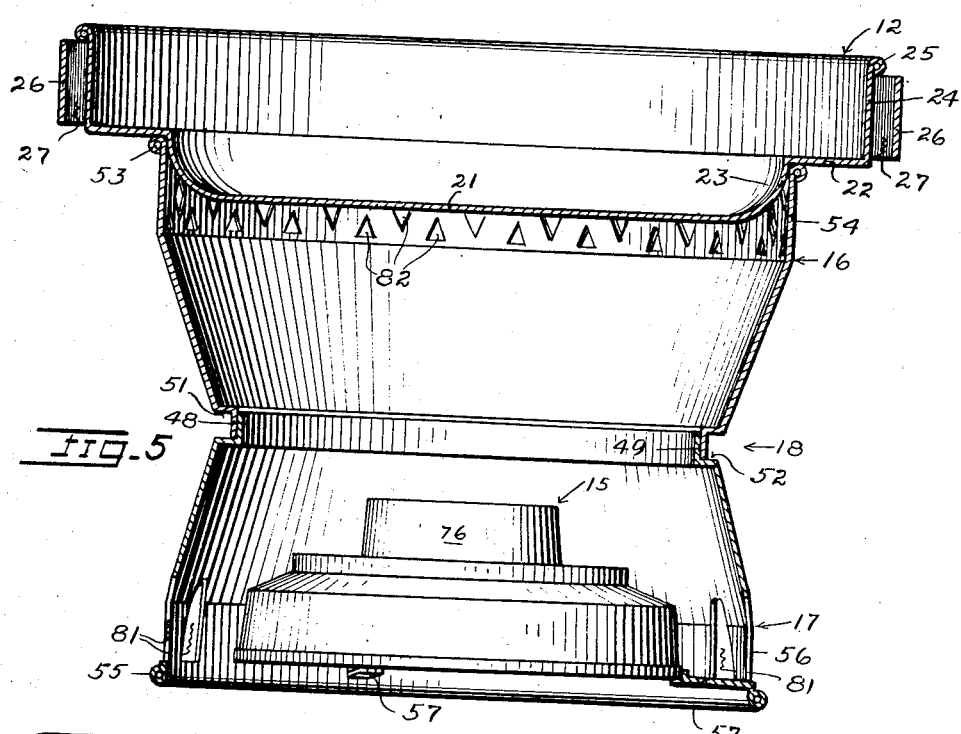
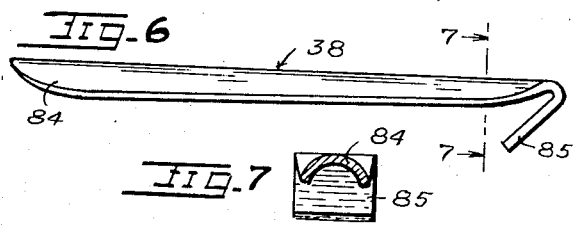
INVENTOR.
CONRAD P. GOERL
BY Henry N. Young
ATTORNEY April 11, 1939.     C. P. GOERL     2,154,305
COOKING KIT
Filed March 9, 1936     3 Sheets-Sheet 3

INVENTOR.
CONRAD P. GOERL
BY Henry N. Young
ATTORNEY

Patented Apr. 11, 1939

2,154,305

UNITED STATES PATENT OFFICE 2,154,305

COOKING KIT

Conrad P. Goerl, Oakland, Calif.

Application March 9, 1936, Serial No. 67,900

3 Claims. (Cl. 126—38)

The invention relates to a cooking kit which includes a spirit burner, a plurality of cooking utensils, and a support means for disposing a selected utensil for its heating by the burner.

An object of the invention is to provide a cooking kit of the class described wherein the various elements are arranged for a packed association to provide a particularly compact cooking kit package.

Another object is to provide a kit of the class described wherein cooking utensil elements thereof provide a sealed exterior for the packaged kit while enclosing the burner and other kit elements.

A further object is to provide a support for the cooking utensils which removably engages a utensil mounted thereon against lateral displacement in its place.

Yet another object is to provide a utensil support which is arranged to simultaneously provide a shielding and draft-controlling enclosure for the burner element while the same is in use beneath a utensil of the kit.

The invention possesses other objects and features of advantage, some of which, with the foregoing, will be set forth or be apparent in the following description of a typical embodiment of the invention, and in the accompanying drawings, in which, Figure 1 is an exterior elevation of a packaged cooking kit embodying the features of present invention.

Figure 2 is a side elevation of an assembly of kit elements wherein a pan element of the kit is mounted for heating by means of the burner element of the kit.

Figure 3 is an elevation of a measuring and snuffing cup for use with the burner element.

Figure 4 is a sectional and broken-out view of the packaged kit, and discloses the relation of the various kit elements in the package.

Figure 5 is a sectional elevation of the assembly shown in Figure 2, with the burner element shown in elevation.

Figure 6 is a side view of a pan handle of the kit.

Figure 7 is a section at 7—7 in Figure 6.

Figure 8:
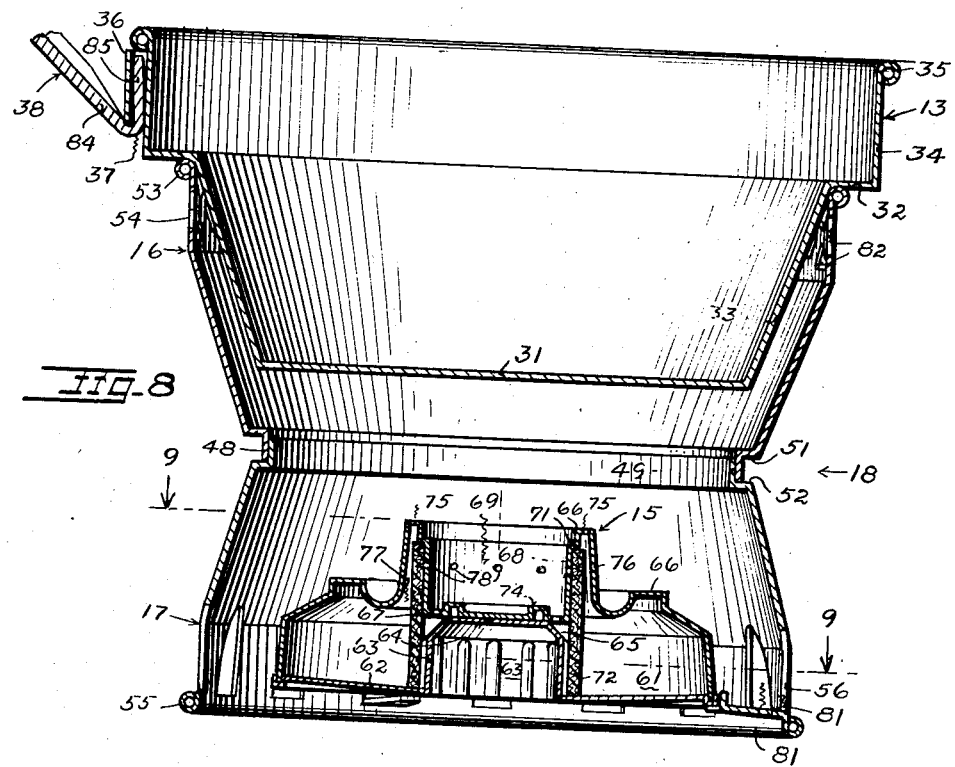
Figure 8 is a sectional elevation of kit elements wherein a different pan element of the kit than that shown in Figure 2 is mounted for heating, and the burner element is shown in section.
Figure 9:
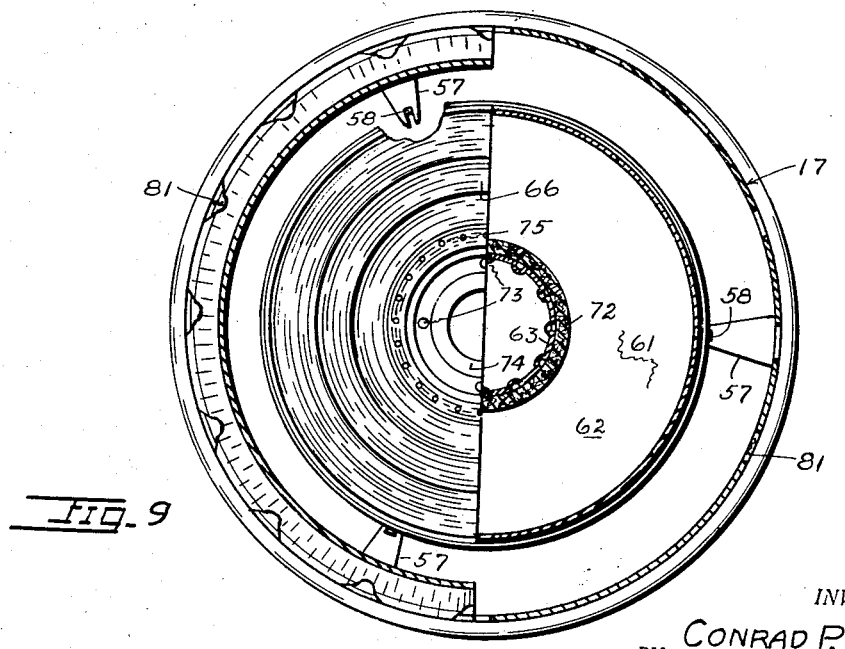
Figure 9 is a stepped plan section taken at the broken line 9—9 in Figure 8.

The illustrated cooking kit 11 comprises pan elements 12 and 13 and 14, a burner element 15, and members 16 and 17 which are arranged to cooperatively provide a generally tubular structure 18 for supporting one of the pan elements while supporting and enclosing the burner element 15. In plan, the aforesaid elements may be circular or oval; in the present showing, these elements are circular.

The pan 12 is relatively shallow, and, for reasons will hereinafter become apparent has a stepped side wall whereby the pan has a circular bottom 21 and an annular portion 22 parallel to said bottom, and the pan side wall has lower and upper portions 23 and 24 which are coterminous with the portion 22 at the different boundaries thereof. As shown, the lower wall portion 23 is curved into tangential relation with the bottom portion 21 whereby to avoid a sharp corner at the juncture of the wall and bottom portions and provide a generally tapered pan bottom portion. An outturned bead 25 is provided at the free edge of the upper wall portion 24 to define the lip of the pan, the latter wall portion being perpendicular to the pan bottom. Collar brackets 26 are provided on the exterior of the wall portion 24 at diametrically opposite points thereof, said brackets comprising strap members which are intermediately offset to provide openings 27 which extend transversely of the plane of the pan bottom. The pan 12 is designed for use as a frying pan.

The pan 13 is relatively deep for use as a stew pan and also has a stepped side structure whereby a circular bottom 31 and an annular portion 32 are defined at opposite sides of a lower wall portion 33 which is conically tapered from the portion 32 to its juncture with the bottom 31. The upper wall portion 34 of the pan 13 is perpendicular to the portion 32, and is provided at its free edge with an outturned bead 35 which defines the pan rim. The wall portion 34 mounts a collar bracket 36 at its outer face, said bracket providing an opening 37 which extends transversely of the plane of the pan bottom and is shaped generally as the openings 27 of the brackets 26.

It will now be noted that the perimeter of the upper portion of the pan 13 is smaller than the bore of the upper portion of the pan 12, whereby the former portion and its bracket 37 may be received within the latter portion when the pans are placed in opposition with their cavities registering as in Figures 1 and 4. The closed space thus defined by and between the pans 12 and 13 is arranged to receive the pan 14, the members 16 and 17, the burner 15, a pan lifter 38, a cup 39 and plates 40 and 41, all as arranged in Figure 4.

As illustrated, the plates 40 and 41 may be nested together and within the pan 12 whereby the flat radial rim portion of the plate 40 may lie flat against the inner face of the pan portion 22, and the plate 41 may fit generally within the plate 40. Preferably, and as shown, the said plate rim portions are arranged to be respectively engaged with the lips of the pans 14 and 13 when the pan 12 receives the upper parts of the former pans.

The lifter 38 and drinking cup 39 are disposable in the space defined between the plate 41 and the member 17 and the bottom of the pan 14, the open side of said cup contacting the top of the stove 15. With the various elements assembled as shown, a flexible strap 42, or other tying element, may be passed through the openings 27 of the brackets 26 on the pan 12 for tightening about the assembly to provide a generally sealed enclosure for the elements within the pans 12 and 13 which pans thus jointly and solely provide the exterior of the package.

It will now be noted that the pan 14 is generally similar in form to the pan 13 but is slightly smaller for nesting within the latter pan with its bottom 43 against the bottom 31 of the pan 13. A bracket 46, similar to the bracket 36 of the pan 13, is provided at the exterior of the upper wall portion 44 of the pan 14, said pan having a conically tapered lower wall portion 45 extending from its annular bottom portion 47 to the circular bottom 43 of the pan. Preferably, the outer diameters of the pans 12 and 13 and 14 at the inner boundaries of the annular pan portions 22 and 32 and 47 respectively are alike, the reason for this relation being hereinafter brought out.

Referring now to the structures of the support members 16 and 17, it will be noted that both members are generally frusto-conical in outline. At their smaller end portions, the members 16 and 17 are stepped inwardly to provide cylindrical collars 48 and 49 respectively extending from radial shoulders 51 and 52. The collar 48 of the member 16 is arranged to snugly receive the collar 49 of the member 17 whether the members are nested together as in Figure 4 or engaged to provide the support 18 as in Figures 2 and 5 and 8; in the former case, the shoulder 51 of the member 16 seats against the inner face of the shoulder 52 of the member 16, while in the latter case the free edge of the collar 48 engages the shoulder 52 to limit the telescopic engagement of the collars.

At its larger end, the top support member 16 is provided with an outturned bead 53, and a wall portion 54 adjacent the bead 53 is truly cylindric with the bore of said portion having the same diameter as the previously mentioned like pan diameters at the inner edges of the portions 22 and 32 and 47 of the pans 12 and 13 and 14 respectively. In this manner the smaller and bottom portion of any one of said pans may be fittedly engaged within the wall portion 54 and be restrained against lateral displacement while the pan is mounted on the member; the frying pan 12 is shown as being so mounted in Figures 2 and 5, while Figure 8 shows the stew pan 13 similarly mounted on the support assembly 18.

At its larger end, the member 17 is provided with an outturned bead 55 which is arranged to contact any suitable horizontal supporting surface. An untapered wall portion 56 is provided adjacent the bead 55, and bracket arms 57 extend radially inwardly from said wall portion to jointly provide a support for the burner 15 in centered position within the support unit 18. As shown, tongues 58 extend upwardly from the bracket arms 57 adjacent their free ends for centering the burner in its place on the arms 57.

Referring now to the structure of the burner 15, it will be noted that this kit element comprises a receptacle having an annular reservoir space 61 defined therein. A central portion of the bottom wall 62 is offset upwardly to define a portion 63 of the inner side wall of the space 61, said wall portion being cylindrical and longitudinally fluted. The top 64 of the offset is circular and is somewhat smaller in diameter than the cylinder of the wall portion 63, is imperforate, and is connected with the wall portion 63 by means of an imperforate and conically tapered wall portion 65, it being noted that the portion 64 is substantially midway of the height of the burner.

The top wall 66 of the burner is depressed centrally thereof to provide a portion 67 which may engage flat against the portion 64 of the bottom wall 62. The lower and major portion of the side wall 68 of the depression 69 extends in the line of the reservoir wall 63 as a continuation thereof. Adjacent its upper end, the wall 68 is stepped outwardly to a slight degree to provide a shoulder 71 within the space 61. A tubular wick 72 for effecting a capillary lifting of liquid fuel from the bottom portion of the reservoir space 61 is engaged about the reservoir inner wall portions 63 and 68, and between the shoulder 71 and the reservoir bottom 62 at the base of the wall portion 63, the installation being permanent. The wall 67 at the bottom of the depression 69 is provided with a plurality of openings 73 adjacent its outer edge, said openings communicating with the free space above the sloping wall 65. An annular ring or dam 74 extends upwardly from the wall portion 67 within the circle of openings 73 to define a relatively shallow cup within the depression 69. As shown, the ring 74 comprises an upwardly offset portion of the wall 67.

It will be understood that when the liquid fuel is placed within the depression 69, it will flow therefrom through the openings 73 into the reservoir space 61 while leaving a charge of the liquid in the central cup defined within the ring 74. The cup comprises a priming cup or fire-pot for effecting a heating of the wall 68 and the wick 72 for vaporizing liquid in the wick for burning at the jet openings of the burner.

A circle of jet openings 75 is provided in the receptacle top wall portion adjacent the mouth of the depression 69 whereby gas escaping from the wick and receptacle may be ignited to provide a circle of fire thereat. Outwardly of the circle of jet openings 75, the top burner wall is depressed to substantially the level of the wall portion 67 whereby a generally cylindrical top wall portion 76 is arranged to lie radially outwardly of the upper wick portion in slightly spaced relation thereto. It will thus be understood that the upper wick portion will lie within an annular portion 77 of the space 61 which is relatively thin radially thereof, said space normally containing gas only. A limited number of openings 78 are provided in the wall portion 68 slightly below the shoulder 71.

It will now be noted that with a volatile liquid fuel in the reservoir space 61 for wetting the wick 72, and with a charge of said liquid in the priming cup, a lighting of the priming charge is arranged to produce heat enough to generate gas for escape through the openings 78 and 75 for ignition and burning thereat, the generated gas being progressively ignited at the respective openings. With the burner formed of a heat-conducting material, the burning of the gas emitted from the openings 78 and 75 is arranged to maintain the flow of gas at said openings whereby the fire may continue to burn after the priming charge has been consumed.

It will now be noted that the wall 76 is slightly tapered whereby its circumference is smaller at the top thereof. A cup-like member 79 is provided for mounting on the annular extension of the burner structure provided by and between the walls 66 and 76, the bore of the member being complementary to the outer face of the wall 76 whereby it may be mounted and frictionally held on said extension in sealed engagement therewith. The member 79 would be normally mounted on the burner when the same is not in use and may be applied as a snuffer to put out a fire of the burner. This member is also arranged for use as a fuel-measuring cup. With the present burner, which has been designed for burning fuel alcohol or another liquid having approximately the same volatility, each cupful of the liquid will actually provide a predetermined period of burning for the burner, whereby the number measures of fuel placed in the reservoir 61 at a charging thereof will provide a fire for a definitely known time. If desired, a pouring spout 80 may be provided on the cup 79.

To insure a complete use of the amount of fuel placed in the burner, the reservoir bottom 62 preferably slopes downwardly to the base of the wick 72. It will be noted that the fluting of the wall portion 63 provides for a ready flow of the liquid charge from the depression 69. Also, the present burner arrangement involves no valves or other adjustable elements, and the wick 72 is not consumed.

With the described burner structure, the necessary air for supporting the combustion of the generated and discharged gas must be supplied from the sides of the burner. Accordingly, a series of air inlet openings 81 is provided in the side portion 56 of the member 17, and outlet openings 82 are provided in the wall portion 54 of the member 16. The two sets of openings 81 and 82 are arranged to each provide total and effective gas passages in such relation to each other and the requirements for a proper and complete burning of fuel at the burner as to insure a maximum use of the generated heat. Also, the circumferential restriction of the tubular assembly 18 at the juncture of the sections 16 and 17 thereof insures a directing of the inflowing air from the openings 81 centrally over the top line of jet openings 75 for supporting the combustion thereat, with the hot combustion products rising and spreading in the section 16 against a pan bottom at its upper end. In this manner, the fullest possible distribution of the generated heat is assured, such being further and materially aided by the extension of the pan bottoms opposite the discharge openings 82 to constrict the effective outlet thereat.

As shown, the air inlet openings 81 are generally triangular, and the material from three of these openings is bent inwardly from the bottom thereof as an integral portion of the member 17 to provide the burner supporting brackets 57. By reference to Figure 4, it will be noted that, by reason of the extension of the bracket arms 57 within the storage space of the packaged assembly, the member 16 must be removed before the burner 15 may be removed, and vice versa when the kit is being assembled.

The present cooking kit has been designed particularly for outdoor use by campers and travellers, and so must operate satisfactorily in drafty or even windy locations as well as in still air. Accordingly, the circumferential lines of regularly spaced openings 81 and 82 in the assembly 18 are preferably less than a complete circle whereby to leave imperforate areas of the portions 56 and 54, as shown in Figure 2. These closed wall parts may be suitably directed with respect to the direction of air movement whereby the stove may operate properly in a drafty location. Since the members 16 and 17 are relatively adjustable about their common axis, the imperforate parts of the portions 56 and 54 may be independently adjusted with respect to the air flow against the set up assembly 18.

Referring now to the structure of the pan lifter 38, it will be noted that the latter is arranged to be shaped of sheet metal to have a handle portion 84 of arcuate cross-section, and a flat head or bit portion 85 which defines an acute angle with the portion 84 and is arranged for insertion in the opening of a collar bracket 26 or 36 or 46 of a pan 12 or 13 or 14 for handling the pan, insertion being effected from the lower end of the opening. The operative application of the lifter is indicated in Figures 2 and 8.

From the foregoing description taken in connection with the accompanying drawings, the advantages of the construction and method of operation will be readily understood by those skilled in the art to which the invention appertains. While I have described the features and the principles of operation of a structure which I now consider to be a preferred embodiment of my invention, I desire to have it understood that the showing is primarily illustrative, and that such changes may be made, when desired, as fall within the scope of the following claims.

I claim:

1. In a cooking kit of the class described, a burner, a cooking pan, a tubular support member having its axis upright and mounting said pan at its top rim with the pan sealing its upper end and having a portion thereof extending into the bore of the member in laterally spaced relation thereto, said member receiving the burner within its lower portion and in laterally spaced relation to the bore of the member thereat and providing brackets for supporting the burner above the base of the member, and outlet and inlet openings provided in said support member solely opposite the depending pan bottom and the burner respectively for controlling the circulation of heat from the burner with respect to the pan bottom.

2. In a cooking kit of the class described, a tubular support member having its axis upright and arranged to enclose a burner and to support a cooking pan on its top rim with the pan sealing its upper end, said support member comprising sections which are mutually engaged for a relative rotative adjustment thereof about their common axis and being provided with discontinuous circumferential lines of outlet and inlet openings in their top and bottom sections respectively for relative rotative adjustment with the sections for regulating the circulation of heat from the enclosed burner with respect to the bottom of a pan mounted on the member and with reference to the existing airflow externally of and laterally against the support member.

3. In a packageable cooking kit of the class described, the combination of a burner, and a tubular pan-supporting member having integral means thereof arranged to support the burner upright within the member in spaced relation to its sides and lower end when in one upright position and arranged for its enclosing inversion over the burner when the kit is packaged.

CONRAD P. GOERL.